J. A. PERRY.
Churning Apparatus.
No. 204,245.   Patented May 28, 1878.
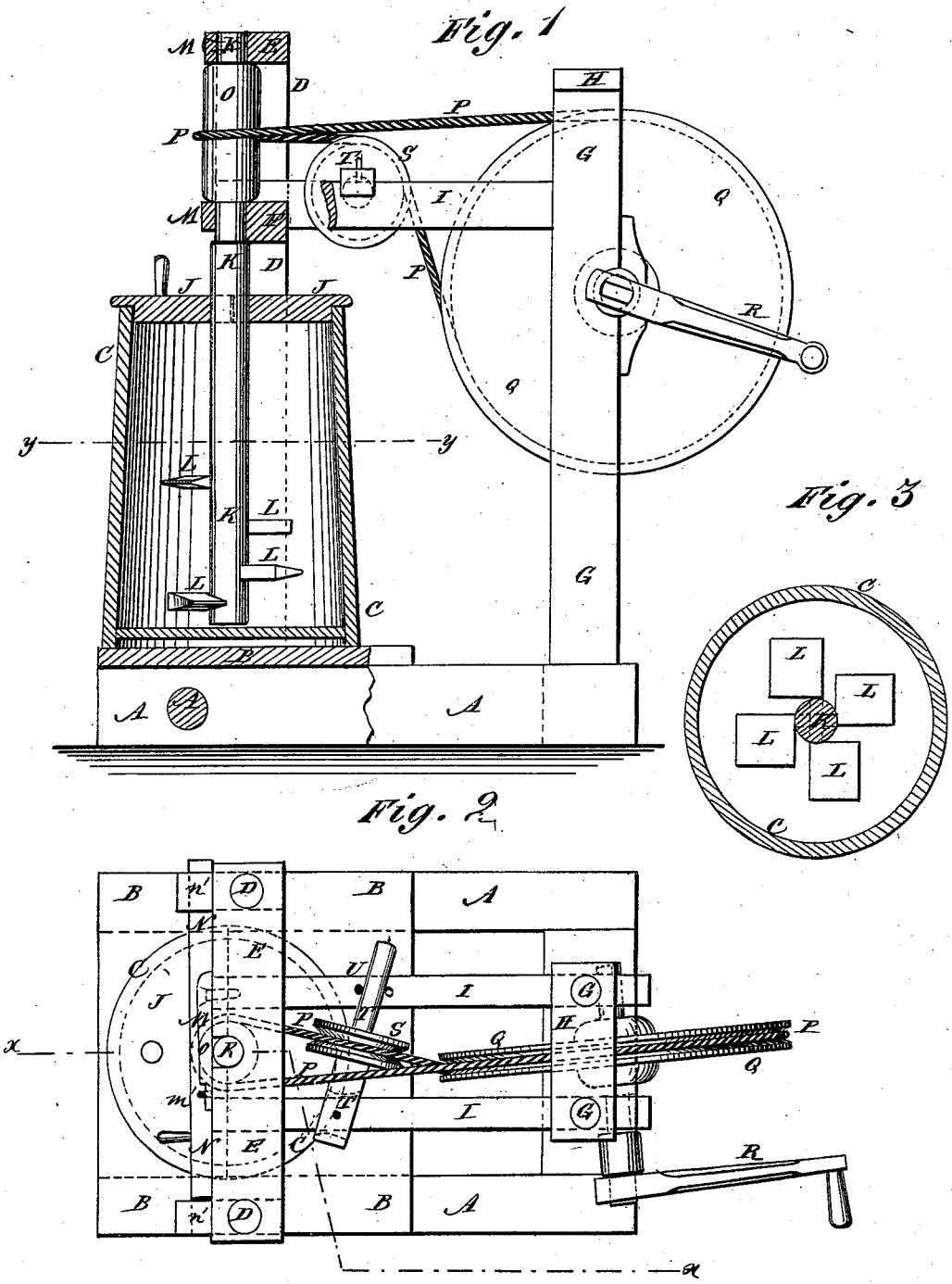

UNITED STATES PATENT OFFICE.

JOHN A. PERRY, OF CARTHAGE, ALABAMA.

IMPROVEMENT IN CHURNING APPARATUS.

Specification forming part of Letters Patent No. 204,245, dated May 28, 1878; application filed February 20, 1878.

*To all whom it may concern:*

Be it known that I, JOHN ALEXANDER PERRY, of Carthage, in the county of Hale and State of Alabama, have invented a new and useful Improvement in Churning Apparatus, of which the following is a specification:

Figure 1 is a side view of my improved churning apparatus, partly in vertical section through the line $x\ x$, Fig. 2. Fig. 2 is a top view of the same. Fig. 3 is a detail horizontal section taken through the line $y\ y$, Fig. 1.

Similar letters of reference indicate corresponding parts.

The object of this invention is to furnish an improved churning apparatus which shall be so constructed that it may be used with ordinary churns without any change whatever in said churns, and which shall be simple in construction, inexpensive in manufacture, strong and durable, and effective in operation, bringing the butter quickly, developing all the butter there may be in the milk, and gathering the butter so that it can be readily removed.

The invention will first be described in connection with the drawing, and then pointed out in the claim.

A is the base-frame of the machine, to the forward part of which is attached a platform, B, for the churn-body C to stand upon.

To the forward parts of the side bars of the frame A are attached the lower ends of two uprights, D, connected at their upper ends by a cross-bar, E, and at a little distance below said upper ends by a second cross-bar, F.

To the rear cross-bar of the frame A are attached the lower ends of two uprights, G, the upper ends of which are connected by a cross-bar H.

To the uprights G, a little below their upper ends, are attached the rear ends of two side bars, I, the forward ends of which are attached to the lower cross-bar F.

The churn-body C is provided with a cover, J, which is made in the form of two half-circles, which are notched in the centers of their straight edges to receive and fit upon the dasher-shaft K.

To the lower part of the shaft K, and at different distances from its lower end, are attached a number of cutters, L, which are made rectangular in form, wedge-shaped in their cross-section, so that they will pass through the milk readily, and of any length that the size of the churn-body may require.

The upper part of the dasher-shaft K passes through and revolves in notches in the forward sides of the cross-bars E F, where it is kept in place by the bar or button M and the bar N. The button or bar M is pivoted at one end to the upper cross-bar E at one side of the notch for the dasher-shaft K, and shuts down into a half-keeper, $m'$, attached to the said bar E at the other side of the said notch. The bar N slides in keepers $n'$, attached to the uprights D.

The part of the shaft K between the cross-bars E F has an enlargement or drum, O, formed upon or attached to it, the lower end or shoulder of which rests upon the upper side of the lower cross-bar F, to support the dasher K, so that its lower end will not need to be supported.

Around the enlargement or drum O passes a band, P, which also passes around a large pulley or wheel, Q. The journals of the wheel Q revolve in bearings attached to the rear uprights G, and to the projecting end of one of the said journals is attached the crank R, by means of which the machine is operated.

The part of the band P that passes from the lower part of the wheel Q to the enlargement or drum O passes over a guide-pulley, S, which revolves upon an axle, T. One end of the axle T is notched to one of the side bars I, and is kept in place by a pin, and its other end rests upon the other side bar I, where it is secured in place adjustably by a pin, U, inserted in a hole in the said bar I. Several holes are formed in the bar I to receive the pin U, so that the axle T and pulley S may be adjusted as may be required.

With this construction the guide-pulley S and the axle T serve the double purpose of guiding the band P into proper position to pass around the drum or enlargement O of the dasher-shaft K, and of regulating the tension of the said band.

Having thus described my invention, I claim as new and desire to secure by Letters Patent—

The combination of the dasher-shaft K, having an enlargement or drum, O, upon its upper part, the lock-bars M N, the band P, and the wheel Q and crank R, with each other, and with the frame-work A B C D E F G H I, substantially as herein shown and described.

JOHN ALEXANDER PERRY.

Witnesses:
 W. L. CORBIN,
 N. W. ELLIOTT.